United States Patent
Odaira (12)

(10) Patent No.: US 6,274,223 B1
(45) Date of Patent: Aug. 14, 2001

(54) MAGNETIC RECORDING MEDIUM

(75) Inventor: Muneharu Odaira, Miyagi (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/515,915

(22) Filed: Mar. 1, 2000

(30) Foreign Application Priority Data

Mar. 18, 1999 (JP) ............................................... P11-073718

(51) Int. Cl.[7] ..................................................... G11B 5/735
(52) U.S. Cl. ........................... 428/141; 428/323; 428/332; 428/413; 428/425.9; 428/532; 428/694 BB; 428/900
(58) Field of Search ..................................... 428/141, 323, 428/332, 413, 425.9, 532, 694 BB, 200

(56) References Cited

U.S. PATENT DOCUMENTS 5,069,963 * 12/1991 Yanai et al. ........................... 428/323
5,089,331 * 2/1992 Ryoke et al. ......................... 428/323

* cited by examiner

Primary Examiner—Stevan A. Resan
(74) Attorney, Agent, or Firm—Sonnenschein, Nath & Rosenthal

(57) ABSTRACT

A magnetic recording medium incorporating a backcoat layer which exhibits excellent movement characteristics, the magnetic recording medium having a non-magnetic support member; a magnetic layer formed on either surface of the non-magnetic support member and mainly composed of magnetic powder and a binder; and a backcoat layer formed on another surface of the non-magnetic support member and structured such that non-magnetic powder is dispersed in a binder, wherein the backcoat layer contains the non-magnetic powder composed of carbon black and inorganic powder having Moh's hardness of 6 to 9 at a ratio of 90:10 to 85:15, the contained binder is made of phenoxy resin, polyurethane resin and nitrocellulose, the contained carbon black consists of carbon black having an average primary particle size of 25 nm to 55 nm and carbon black having an average primary particle size of 280 nm to 350 nm and the contained inorganic powder consists of inorganic powder having an average primary particle size of 260 nm to 360 nm and inorganic powder having an average primary particle size of 390 nm to 490 nm.

4 Claims, No Drawings

MAGNETIC RECORDING MEDIUM

BACKGROUND OF THE INVENTION

1. Field of the Invention

The present invention relates to a magnetic recording medium, and more particularly to a coating-type magnetic recording medium incorporating a magnetic coating film as a magnetic layer thereof and a backcoat layer formed on another surface thereof and arranged to be used in a data media.

2. Description of the Related Art

In recent years, magnetic recording mediums have been widely employed for audio apparatuses, video apparatuses, computers and the like. The need for the magnetic recording mediums has considerably been raised.

In general, a magnetic recording medium of the foregoing type has a structure that a magnetic layer composed of magnetic powder and a binder is formed on a non-magnetic support member constituted by a polyester film and the like. Moreover, a backcoat layer composed of non-magnetic powder and a binder is formed on another surface of the non-magnetic support member. Usually, the backcoat layer is formed by applying or transferring, to the non-magnetic support member, a backcoat coating material in which non-magnetic powder is dispersed in a composition containing the binder.

Hitherto, the binder has been made of an organic polymer compound, such as polyester resin, cellulose resin, polyurethane resin, vinyl chloride resin, vinyl chloride-vinyl acetate copolymer, vinyl chloride-vinyl acetate-vinyl alcohol copolymer, vinyl chloride-vinylidene chloride copolymer, acrylonitrile-butadiene copolymer, ferrol resin, epoxy resin, polyamide resin, polyvinyl butyral, nitrocellulose, cellulose acetate butyrate, acrylic resin or electron-ray setting resin.

Since the foregoing binders have advantages and disadvantages, sole use of the binder does not permit a magnetic layer or a backcoat layer having required characteristics to easily be obtained. Therefore, two or more types of the binders are combined with one another. For example, combination of relatively hard resin, such as vinyl chloride resin, polyvinyl butyral or nitrocellulose, and soft resin, such as polyester resin, polyurethane resin or acrylonitrile-butadiene copolymer, is frequently employed. To improve the durability of the magnetic layer and the backcoat layer, a polyisocyanate compound is frequently employed as a hardening component.

In recent years the capacity of the magnetic recording medium has considerably been enlarged. As a means for enlarging the capacity, the coating-type magnetic recording medium has variously been devised such that the recording method is improved by reducing the track pitch or by shortening the recording wavelength or the overall length of the medium is elongated. In particular, the method with which the recording wavelength is shortened requires the adaptable medium to have a high recording density and to be capable of producing a large output.

The foregoing high-density recording medium is usually provided with a backcoat layer in order to maintain a required movement characteristic with respect to a drive.

The backcoat layer must have a required movement characteristic with respect to the corresponding drive. To preserve data, the initial characteristics must be maintained even if the recording medium is reserved for a long time or even after the recording medium has been reserved in a hot and wet condition. Since the backcoat layer is in direct contact with the ground magnetic layer during the reservation, excessive roughness of the surface shape of the backcoat layer causes the rough surface shape to be transferred to the magnetic layer. In the foregoing case, dropout increases and/or the error rate is undesirably raised. There is apprehension that sticking between the backcoat layer and the magnetic layer occurs or corrosion takes place according to the selected material which constitutes the backcoat layer. The magnetic layer of the high-density recording medium must inevitably have a mirror surface. Also the structure of the magnetic layer is usually constituted by a coating-type medium containing magnetic alloy powder. Therefore, the backcoat must meet furthermore severe requirements to realize the above-mentioned reservation characteristics.

In general, the backcoat layer has a structure that non-magnetic powder is dispersed in a binder. In particular, a structure is usually employed in which carbon black is, as a main component, dispersed in the binder and other carbon black, a variety of pigments or a variety of additives are blended under certain circumstances. The reason why the foregoing carbon black is employed in the backcoat is to lower the surface electric resistance of the backcoat layer, prevent adhesion of dust owing to static electricity, impart a light shielding characteristic to prevent malfunction and improve the durability against movement.

An example of use of carbon black as the non-magnetic powder has been disclosed in Japanese Patent Publication No. 52-17401. The foregoing disclosure is structured to obtain an antistatic effect using the conductivity of carbon black, a light shielding effect and a surface coarsening effect owing to coagulation of carbon particles. However, carbon black of a type having a particle size of 10 nm to 20 nm cannot easily be formed into a coating material. If carbon black is formed into the coating material, coagulated particles are easily formed. As described above, carbon black having the small particle size and suffering from a defective dispersion characteristic cannot easily be formed into a structure having an average roughness with which the foregoing asperities can be prevented. The reason why dispersion cannot easily be performed is considered that carbon black having an excessively small average particle size easily has secondary structures.

In Japanese Patent Laid-Open No. 63-144416, an example has been disclosed in which thermal black type carbon black having a particle size of 60 nm to 200 nm is employed. Carbon black of the foregoing type having a small number of structures can uniformly be dispersed in the binder. Moreover, the friction factor can effectively be reduced. However, prevention of asperities is limited owing to the particle size of carbon black after the uniform dispersion has been prevented. Therefore, carbon black of the foregoing type cannot be used to form the backcoat of a high-density recording medium.

An example arranged to use a plurality of types of carbon black has been disclosed in Japanese Patent Publication No. 2-49490. A main object of the foregoing disclosure is to improve wear resistance. In the foregoing disclosure, carbon black having a particle size of 10 nm to 35 nm and another type carbon black having a particle size of 40 nm to 150 nm are employed. In Japanese Patent Publication No. 4-81261, small-size carbon black having an average particle size of 30 nm to 100 nm and coarse carbon black having an average particle size of 150 nm to 500 nm are employed. However, simple employment of both of the small particle size and the large particle size of the carbon black cannot easily simultaneously meet required movement characteristics and reservation characteristics of the high-density recording medium.

A multiplicity of attempts have been made to employ both of carbon black and another inorganic pigment as the non-magnetic powder. For example, in Japanese Patent Publication No. 5-72647, use of carbon black and addition of inorganic pigment, such as $CaCO_3$, $BaSO_4$ or $Fe_2O_3$, having a Moh's hardness of 6 or smaller has been disclosed in order to reduce the quantity of undesirable cutting of the surface of the backcoat. Since the binder is made of vinyl chloride copolymer or fiber-type resin, the foregoing structure serving as the backcoat of a coating-type medium incorporating magnetic alloy powder cannot satisfactory be reserved in a hot and wet environment.

Another attempt has been made in which a plurality of carbon materials and another inorganic pigment are combined with one another. In each of Japanese Patent Laid-Open No. 2-42624, Japanese Patent Laid-Open No. 2-42625, Japanese Patent Laid-Open No. 2-134720 and Japanese Patent Laid-Open No. 2-141925, simultaneous employment of carbon black having an average primary particle size of 20 nm to 40 nm, carbon black having an average primary particle size of 50 nm to 100 nm and another pigment has been disclosed. Each of the foregoing disclosures arranged to use fiber resin as the binder cannot be used as the backcoat of the coating-type medium incorporating magnetic alloy powder because satisfactory preservation in a hot and wet environment cannot be permitted. The foregoing inorganic pigment employed to adequately roughen the surface and having an average particle size of 300 nm to 1500 nm encounters a problem of transfer of the backcoat surface.

The employed binder has an excellent characteristic for permitting dispersion of non-magnetic powder, satisfactory adhesiveness with the non-magnetic support member and sufficient wear resistance of the formed film. For example, a thermosetting material is employed which is obtained by combining one or more types of the following resin materials: polyurethane resin, polyester resin, fiber resin, vinyl chloride copolymer resin and phenoxy resin is solely employed and a polyisocyanate compound. As an alternative to this, combination with resin having a radioactive-ray functional unsaturated double-bond is employed.

However, vinyl chloride copolymer resin or the fiber resin which has possibility of producing corrosive gas is not suitable as the binder for the backcoat of the coating-type medium which incorporates magnetic allow powder. Structures each of which does not incorporate the vinyl chloride copolymer resin or the fiber resin has been disclosed in Japanese Patent Laid-Open No. 58-200426 and Japanese Patent Laid-Open No. 59-2228. The binder is constituted by phenoxy resin, thermoplastic polyurethane elastomer and polyisocyanate. The foregoing binder system is, however, employed to simply and mainly improve the initial durability against movement. That is, improvement in the reservation characteristic is not attempted. Moreover, there is no discussion about the dispersion characteristic of the contained polyurethane elastomer. The polyurethane elastomer described in the embodiment has no polar group. A binder system obtained by combining polyurethane elastomer and phenoxy resin cannot sufficiently disperse inorganic powder. A filler employed in the foregoing disclosures is constituted by inorganic powder of $CaCo_3$ or the like or carbon black. Each of the foregoing components is employed solely. No description is made about use of a mixture of two or more materials above. Therefore, maintaining of the conductivity, reduction in the surface electric resistance, prevention of adhesion of dust owing of static elasticity and improvement of the wear resistance of the backcoat surface cannot simultaneously be realized. Although a multiplicity of suggestions to impart the polar group to the polyurethane elastomer have been made, any suggestion for improving the dispersion characteristic of carbon black in the mixture system with phenoxy resin has not been made.

In Japanese Patent Publication No. 1-91317, Japanese Patent Laid-Open No. 6-325353, Japanese Patent Laid-Open No. 7-169040 and Japanese Patent Laid-Open No. 8-17037, polyurethane containing amine has been disclosed. In the foregoing disclosures, no description is made about the particle size of carbon black and combination of phenoxy resin and inorganic pigment.

SUMMARY OF THE INVENTION

An object of the present invention is to provide a magnetic recording medium which incorporates a backcoat layer which exhibits excellent movement characteristics, and specifically low friction during the movement and satisfactory wear resistance, which is capable of maintaining the initial movement characteristics even at high temperatures, which is free from excessive deterioration in the initial dropout level or the error rate and which is employed in a data medium.

According to the present invention, there is provided a magnetic recording medium comprising: a non-magnetic support member; a magnetic layer formed on either surface of the non-magnetic support member and mainly composed of magnetic powder and a binder; and a backcoat layer formed on another surface of the non-magnetic support member and structured such that non-magnetic powder is dispersed in a binder, wherein the backcoat layer contains the non-magnetic powder composed of carbon black and inorganic powder having Moh's hardness of 6 to 9 at a ratio of 90:10 to 85:15, the contained binder is made of phenoxy resin, polyurethane resin and nitrocellulose, the contained carbon black consists of carbon black having an average primary particle size of 25 nm to 55 nm and carbon black having an average primary particle size of 280 nm to 350 nm and the contained inorganic powder consists of inorganic powder having an average primary particle size of 260 nm to 360 nm and inorganic powder having an average primary particle size of 390 nm to 490 nm.

It is preferable that surface roughness of the backcoat layer is 0.04 $\mu$m to 0.06 $\mu$m in terms of a three-dimensional roughness Ra.

It is preferable that a mixture ratio of carbon black having the average primary particle size of 25 nm to 55 nm and carbon black having the average primary particle size of 280 nm to 350 nm is 80:20 to 70:30.

It is preferable that a mixture ratio of inorganic powder having the average primary particle size of 260 nm to 360 nm and inorganic powder having the average primary particle size of 390 nm to 490 nm is 10:90 to 40:60.

Other objects, features and advantages of the invention will be evident from the following detailed description of the preferred embodiments described in conjunction with the attached drawings.

DESCRIPTION OF THE PREFERRED EMBODIMENTS

A magnetic recording medium according to the present invention incorporates a non-magnetic support member having a backcoat layer formed on another surface thereof. The backcoat layer contains two types of carbon black materials, two types of inorganic powder materials and three types of binders. Carbon black has average primary particle sizes of 25 nm to 55 nm and 280 nm to 350 nm, respectively. Inorganic powder has Moh's hardness of 6 to 9 and consists of a type having an average primary particle size of 260 nm to 360 nm and an average primary particle size of 390 nm to 490 nm. The ratio of inorganic powder with respect to carbon black is such that carbon black:inorganic powder= 90:10 to 85:15 in terms of a weight ratio. The binder contains phenoxy resin, polyurethane resin and nitrocellulose.

Main carbon black for use in the present invention has the average primary particle sizes of 25 nm to 55 nm and 280 nm to 350 nm. It is preferable that the DBP oil absorption is 30 ml/100 g to 170 ml/100 g.

Carbon black of the foregoing type is exemplified by combination of #4500 manufactured by Tokai Carbon and MT-CI manufactured by Colombian Chemical. When carbon black satisfying the particle size ranges from 25 nm to 55 nm and 280 nm to 350 nm is employed, appropriate surface roughness and required prevention of friction during movement can simultaneously be realized.

Carbon black of a type having an average primary particle size of 10 nm to 20 nm frequently has great structures. Therefore, dispersion cannot easily be performed. The backcoat surface is roughened excessively owing to needle-shape projections, causing a problem to arise in transfer of the backcoat surface. Carbon black having particle sizes of 20 nm or greater and smaller than 25 nm can be dispersed if the specific surface area is 250 m$^2$/g or smaller. However, there arises a problem in that the initial movement friction occurs excessively. Carbon black of the foregoing type is exemplified by Conductex SC manufactured by Colombian Chemical.

If the average primary particle size of carbon black is larger than 350 nm, particles of carbon black undesirably form a rough surface if carbon black does not have the secondary structure and uniform dispersion occurs. Thus, there arises a problem in that the magnetic surface is undesirably cut. Carbon black of the foregoing type is exemplified by UFG-B-A manufactured by Showa Denko.

Therefore, use of both of carbon black having the average primary particle size of 25 nm to 55 nm and that having the average primary particle size of 280 nm to 350 nm permits appropriate surface roughness and satisfactory reduction in the movement friction to simultaneously be realized.

It is preferable that the shape of each particle of carbon black for use in the present invention is a thermal type particle having substantially a spherical shape. The reason for this lies in that the structure cannot easily be formed, uniform dispersion into the binder can easily be performed and friction resistance can be prevented.

The Moh's hardness of inorganic powder according to the present invention is 6 or greater, preferably 6 to 9. If the Moh's hardness is smaller than 6, the wear resistance deteriorates. Thus, the back surface is undesirably cut, causing a problem to arise. If the Moh's hardness is larger than 9, a movement passage constituted by capstans and guides of the corresponding drive wears according to the material of the components of the movement passage. Thus, there sometimes arises a problem in that produced dust adheres to the surface of the magnetic layer.

Inorganic powder having the Moh's hardness of 6 or greater is made of a material exemplified by aluminum oxide, titanium oxide, barium carbonate, chrome oxide, silicon carbonate and α-iron oxide. In particular, inorganic powder having the Moh's hardness which satisfies the range from 6 to 9 is exemplified by aluminum oxide, titanium oxide, barium carbonate, chrome oxide and α-iron oxide.

When the foregoing inorganic powder is added, the wear resistance can be improved. Therefore, the particle size and the quantity of added inorganic powder are determined in accordance with relationship between the effect of improving the wear resistance and transfer to the magnetic surface owing to the roughness of the surface of the backcoat. It is preferable that the particle sizes are 260 nm to 360 nm and 390 nm to 490 nm. The quantity of added inorganic powder is 10 wt % of the overall weight of carbon black. If the quantity is too small, satisfactory wear resistance cannot be realized. If the quantity is too large, the surface of the backcoat is roughened excessively. Thus, transfer from the surface of the backcoat to the magnetic layer deteriorates.

The binder according to the present invention incorporates phenoxy resin, polyurethane and nitrocellulose which are known binder resin materials.

The binder according to the present invention contain phenoxy resin which is YP-50 which is trade name of Toto Chemical, polyurethane which is Miracton 22S which is trade name of Nihon Polyurethane and nitrocellulose which is NC-H301 which is trade name of Asahi Kasei.

The backcoat layer according to the present invention is formed on the surface of the non-magnetic support member by a coating operation. The coating material for forming the backcoat layer is prepared by simultaneously or sequentially introducing the foregoing non-magnetic powder and the binder into a kneader. For example, non-magnetic powder is added to solution containing the binder, and then the solution is kneaded for a predetermined time. Thus, a coating material for forming the backcoat layer is prepared.

The kneading and dispersing operation may be performed by using any one of a variety of kneaders. The kneader is exemplified by a two-roll mill, a three-roll mill, a ball mill, a sand grinder, a Sqegvari attritor, a high-speed mixer, a homogenizer, an ultrasonic dispersing machine, a vertical sand mill, a lateral sand mill, a spike mill and a tower mill.

The thus-prepared coating material for forming the backcoat layer is applied to either surface of the non-magnetic support member layer by a known method. Any one of the foregoing coating methods may be employed: gravure coating, extrusion nozzle coating, reverse roll coating, wire-bar coating, doctor blade coating, dip coating, air-knife coating, calender coating, squeeze coating, kiss coating and fountain coating.

In general, it is preferable that the thickness of the coated layer satisfies a range from 1.0 μm to 2.0 μm, more preferably a range satisfying 1.3 μm to 1.7 μm. It is preferable that the surface roughness is 0.04 μm to 0.06 μm in terms of three-dimensional roughness Ra indicating the average roughness along the center line. Since the foregoing surface characteristics are imparted to the magnetic layer, transfer to the magnetic surface can be prevented. Moreover, stability in movement can be maintained.

The non-magnetic support member is made of a material exemplified by polyester, such as polyethylene terephthalate or polyethylene-2, 6-naphthalate; polyolefine, such as polyamide, polyimide or polypropylene; and cellulose derivative, such as cellulose triacetate or cellulose diacetate.

The thickness of the non-magnetic support member in a case of, for example, a tape, is usually 3 μm to 20 μm, preferably 4 μm to 12 μm.

The magnetic layer formed on either surface of the non-magnetic support member is constituted by dispersing magnetic powder, preferably ferromagnetic powder in a binder. The foregoing ferromagnetic powder is exemplified by Fe—Al alloy powder, Fe—Al—P alloy powder, Fe—Ni—Co alloy powder, Fe—Mn—Zn alloy powder, Fe—Co—Ni—Cr alloy powder, Fe—Co—Ni—P alloy powder, Co—Ni alloy powder, Co—P ally powder, ferromagnetic alloy powder mainly composed of ferromagnetic metal powder such as Fe, Ni or Co and magnetic oxide powder, such as $\gamma$-$Fe_2O_3$, $Ba.Fe_2O_3$ or magnetic oxide powder such as $\gamma$-$Fe_2O_4$ containing Co. The shape of the foregoing ferromagnetic powder is not limited particularly. For example, a needle shape a spherical shape or an elliptic shape may be employed.

The magnetic layer containing the foregoing ferromagnetic powder and the binder may be added with lubricant, an antistatic agent, a hardener and a polishing material, if necessary. Note that each of the foregoing materials has a sole function. For example, one compound sometimes serves both of lubricant and an antistatic agent. The magnetic layer may be manufactured by a coating operation similar to the operation for forming the backcoat layer.

EXAMPLES

Examples of the present invention will now be described. Note that the present invention is not limited to the following examples.

<Forming of Magnetic Layer>

The following materials were mixed with one another for 10 minute so that magnetic materials, which must be kneaded, were prepared. Then, the mixed materials were kneaded. A kneader was a continuous biaxial kneader manufactured by Kurimoto.

Composition of Magnetic Material

Magnetic Powder:

metal-type (Fe) ferromagnetic powder (specific surface area was nearly equal to 58 $m^2$/g and the length of the major axis: 0.13 $\mu$m):

| Composition of Magnetic Material | |
|---|---|
| Magnetic Powder: | |
| metal-type (Fe) ferromagnetic powder (specific surface area was nearly equal to 58 $m^2$/g and the length of the major axis: 0.13 $\mu$m): | 100 parts by weight |
| Binder: | |
| low molecular weight vinyl chloride rein: | 12 parts by weight |
| polyester polyurethane resin: | 3 parts by weight |
| Additive: | |
| alumina (Hit-60A manufactured by Sumitomo): | 10 parts by weight |

The magnetic materials were supplied at a rate of 150 g/minute, and then the materials were kneaded. The kneaded magnetic materials were added with two parts by weight of lubricant (butyl stearate) and organic solvent (125 parts by weight, 75 parts by weight and 25 parts by weight of methylethyl ketone, toluene and cyclohexane) so that a coating material was prepared. The coating material was stirred in a sand mill for four hours so that a magnetic coating material was prepared.

The thus-prepared magnetic coating material was applied to the surface of a non-magnetic support member having a thickness of 4.5 $\mu$m and made of polyethylene terephthalate in such a manner that the thickness of the applied magnetic coating material was 1.5 $\mu$m. When the magnetic coating material was applied, hardeners were added which were 3 parts by weight of Coronate L-50 (polyisocyanate manufactured by Nihon Polyurethane) and 1 part by weight of myristic acid. Then, a calender process was performed, and then the film was allowed to stand in an oven set to be 60° C. for 20 hours so that a wide base film having the magnetic layer was manufactured.

<Forming of Backcoat Layer>

A material obtained by combining materials shown in Table 1 with the following composition was mixed with one another in a sand mill for 1.5 hour. Then, the material was allowed to pass through a filter. Then, 10 parts by weight of a hardener (Coronate L) and 4 parts by weight of myristic acid were added so that a coating material for forming a backcoat was prepared. The thus-prepared coating material for forming the backcoat was applied to another surface of the above-mentioned film having the magnetic layer in such a manner that the thickness of the applied coating material for forming the backcoat was 1.5 $\mu$m. Then, the film was cut to have a width of 8 mm so that a magnetic tape was manufactured. Then, the magnetic tape was loaded into a cartridge for the 8 mm data tape. A variety of characteristics of the magnetic tape were measured.

Material for Forming Backcoat

Binder:

| Material for Forming Backcoat | |
|---|---|
| Binder: | |
| phenoxy resin (YP-50 manufactured by Toto): | 11 parts by weight |
| Polyurethane Resin (Miractran 22S manufactured by Nihon Polyurethane): | 35 parts by weight |
| Nitrocellulose (HC-H301 manufactured by Asahi Kasei): | 46 parts by weight |
| Solvent: | |
| methylethyl ketone: | 430 parts by weight |
| Toluene: | 280 parts by weight |
| Cyclohexane: | 190 parts by weight |

TABLE 1

| | Carbon Black | | Inorganic Powder | |
|---|---|---|---|---|
| | #4500 | MT-CI | KR-460 | AKP-50 |
| Example 1 | 75 parts by weight | 15 parts by weight | 9 parts by weight | 1 part by weight |
| Example 2 | 75 parts by weight | 15 parts by weight | 6 parts by weight | 4 parts by weight |
| Example 3 | 60 parts by weight | 30 parts by weight | 9 parts by weight | 1 part by weight |
| Example 4 | 60 parts by weight | 30 parts by weight | 6 parts by weight | 4 parts by weight |
| Example 5 | 70 parts by weight | 15 parts by weight | 9 parts by weight | 1 part by weight |
| Example 6 | 70 parts by weight | 15 parts by weight | 13 parts by weight | 2 parts by weight |
| Example 7 | 60 parts by weight | 25 parts by weight | 9 parts by weight | 6 parts by weight |
| Example 8 | 60 parts by weight | 25 parts by weight | 13 parts by weight | 2 parts by weight |
| Comparative Example 1 | 80 parts by weight | 10 parts by weight | 9 parts by weight | 1 part by weight |
| Comparative Example 2 | 55 parts by weight | 35 parts by weight | 6 parts by weight | 4 parts by weight |
| Comparative Example 3 | 75 parts by weight | 15 parts by weight | 10 parts by weight | 0 part by weight |

TABLE 1-continued

|  | Carbon Black | | Inorganic Powder | |
|---|---|---|---|---|
|  | #4500 | MT-CI | KR-460 | AKP-50 |
| Comparative Example 4 | 60 parts by weight | 30 parts by weight | 5 parts by weight | 5 parts by weight |
| Comparative Example 5 | 75 parts by weight | 10 parts by weight | 9 parts by weight | 6 parts by weight |
| Comparative Example 6 | 55 parts by weight | 30 parts by weight | 13 parts by weight | 2 parts by weight |
| Comparative Example 7 | 70 parts by weight | 15 parts by weight | 8 parts by weight | 7 parts by weight |
| Comparative Example 8 | 60 parts by weight | 25 parts by weight | 14 parts by weight | 1 part by weight |

Examples and comparative examples will now be described.

Examples 1 to 8 and Comparative Examples 1 to 8

The composition of the coating material for the backcoat incorporated carbon black #4500 manufactured by Tokai Carbon as carbon black having the average primary particle size of 25 nm to 55 nm and MT-CI manufactured by Colombian Chemicals as carbon black having the average primary particle size of 280 nm to 350 nm. As inorganic powder, KR460 which was inorganic powder having an average primary particle size of 260 nm to 360 nm and Moh's hardness of 9 and manufactured by Titan and AKP-50 which was inorganic powder having an average primary particle size of 390 nm to 490 nm and Moh's hardness of 6 to 7 were employed such that the mixture ratio was as shown in Table 1.

<Surface Roughness>

A surface roughness meter SE-3AK manufactured by Kosaka was employed to measure three-dimensional roughness Ra which indicated the average roughness along the center line.

<Movement Characteristic>

TR-5 drive (QIC-3220 format) manufactured by Seagate was employed to move the tape 1000 times at an environmental temperature of 50° C., and then the tape was allowed to stand at an environmental temperature of 5° C. Then, the tape was moved one time at an environmental coating material of 5° C. Then, the state of winding of the tape was observed. Results were evaluated as follows:

○: satisfactory state;

Δ: although a stepped portion was formed in the wound tape, the normal state was restored by rewinding. That is, no problem arisen from a viewpoint of practical use; and ×: cutting of the tape occurred during movement or movement was impossible due to a defective state of winding.

<Durability>

TR-5 drive (QIC-3220 format) manufactured by Seagate was employed to move the tape 5000 times at an environmental temperature of 45° C. and humidity of 30%. Thus, falling of powder to a portion in the vicinity of the guide pin in the cartridge and the like was observed. Results were evaluated as follows. Results of the evaluation was shown in Table 2.

○: initial states of guide pin and tape were maintained; and

×: guide pin and tape were made hermetic contact with each other, and separation of the tape and seizuring of guide pin occurred.

<Measurement of Error Rate>

TR-5 drive (QIC-3220 format) manufactured by Seagate was employed to write data only one time at room temperatures. Written data was read 5000 times to measure error rates. Results were evaluated as follows. Results of the evaluation were shown in Table 2.

○: error rate was lower than 2000 times and thus a recording capacity was maintained; and ×: error rate was not lower than 2000 times and the recording capacity was not maintained.

TABLE 2

|  | Three-Dimensional Roughness Ra (μm) | Movement Characteristics | Durability | Measured Error Rate |
|---|---|---|---|---|
| Example 1 | 0.041 | Δ | ○ | ○ |
| Example 2 | 0.046 | ○ | ○ | ○ |
| Example 3 | 0.042 | ○ | ○ | ○ |
| Example 4 | 0.047 | ○ | ○ | ○ |
| Example 5 | 0.055 | ○ | ○ | ○ |
| Example 6 | 0.053 | ○ | ○ | ○ |
| Example 7 | 0.060 | ○ | ○ | ○ |
| Example 8 | 0.057 | ○ | ○ | ○ |
| Comparative Example 1 | 0.037 | × | × | ○ |
| Comparative Example 2 | 0.064 | ○ | ○ | × |
| Comparative Example 3 | 0.036 | × | × | ○ |
| Comparative Example 4 | 0.068 | ○ | ○ | × |
| Comparative Example 5 | 0.038 | Δ | × | ○ |
| Comparative Example 6 | 0.074 | ○ | ○ | × |
| Comparative Example 7 | 0.063 | ○ | ○ | × |
| Comparative Example 8 | 0.080 | ○ | ○ | × |

Results of the examples and comparative examples will now be described.

Example 1

A tape of a type added with #4500 in a quantity of 75 parts by weight and AKP-50 in a quantity of 1 part by weight had low surface roughness. Although the movement characteristics deteriorated, no problem arises from a viewpoint of practical use.

Examples 2 to 8

No problem arisen and satisfactory results were obtained.

Comparative Examples 1, 3 and 5

Since the surface roughness was low, the movement characteristics and durability encountered problems from a viewpoint of practical use.

Comparative Examples 2, 4 and 6 to 8

Since the surface roughness was high, the error rate was raised excessively and thus a problem arisen from a viewpoint of practical use.

As described above, according to the present invention, the magnetic recording medium can be provided which is used in a data medium and which incorporates the backcoat layer which is able to reduce friction during movement, which exhibits excellent wear resistance, which is able to maintain the initial movement characteristics even at high temperatures and which is free from excessive deterioration in the initial dropout level or the error rate.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A magnetic recording medium comprising:

a non-magnetic support member;

a magnetic layer formed on either surface of said non-magnetic support member and mainly composed of magnetic powder and a binder; and a backcoat layer formed on another surface of said non-magnetic support member and structured such that non-magnetic powder is dispersed in a binder, wherein said backcoat layer contains said non-magnetic powder composed of carbon black and inorganic powder having Moh's hardness of 6 to 9 at a ratio of 90:10 to 85:15, said contained binder is made of phenoxy resin, polyurethane resin and nitrocellulose, said contained carbon black consists of carbon black having an average primary particle size of 25 nm to 55 nm and carbon black having an average primary particle size of 280 nm to 350 nm, and said contained inorganic powder consists of inorganic powder having an average primary particle size of 260 nm to 360 nm and inorganic powder having an average primary particle size of 390 nm to 490 nm.

2. A magnetic recording medium according to claim 1, wherein surface roughness of said backcoat layer is 0.04 $\mu$m to 0.06 $\mu$m in terms of a three-dimensional roughness Ra.

3. A magnetic recording medium according to claim 1, wherein a mixture ratio of carbon black having the average primary particle size of 25 nm to 55 nm and carbon black having the average primary particle size of 280 nm to 350 nm is 80:20 to 70:30.

4. A magnetic recording medium according to claim 1, wherein a mixture ratio of inorganic powder having the average primary particle size of 260 nm to 360 nm and inorganic powder having the average primary particle size of 390 nm to 490 nm is 10:90 to 40:60.

* * * * *